(12) United States Patent
Deng et al.

(10) Patent No.: US 8,693,677 B2
(45) Date of Patent: Apr. 8, 2014

(54) TECHNIQUES FOR UPDATING FILTER COEFFICIENTS OF AN ADAPTIVE FILTER

(75) Inventors: Hongyang Deng, Austin, TX (US); Roman A. Dyba, San Diego, CA (US); Wen Wu Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 961 days.

(21) Appl. No.: 12/768,275

(22) Filed: Apr. 27, 2010

(65) Prior Publication Data

US 2011/0261948 A1    Oct. 27, 2011

(51) Int. Cl.
*H04M 9/08* (2006.01)
*H04M 1/00* (2006.01)
*H04M 9/00* (2006.01)
*H04B 3/20* (2006.01)

(52) U.S. Cl.
USPC ............... 379/406.08; 370/286; 379/390.02; 379/406.01; 379/406.09

(58) Field of Classification Search
USPC ............ 379/406.08, 406.09, 390.02, 406.01, 379/392.01; 370/286, 287
See application file for complete search history.

(56) References Cited

U.S. PATENT DOCUMENTS

| | | | |
|---|---|---|---|
| 5,590,121 A | 12/1996 | Geigel et al. | |
| 6,185,300 B1 * | 2/2001 | Romesburg | 379/406.09 |
| 6,735,304 B2 * | 5/2004 | Hasegawa | 379/406.08 |
| 6,842,516 B1 * | 1/2005 | Armbruster | 379/390.02 |
| 6,940,829 B2 * | 9/2005 | Walles | 370/286 |
| 7,103,177 B2 | 9/2006 | Taurikulu et al. | |
| 2004/0015529 A1 | 1/2004 | Tanrikulu et al. | |
| 2009/0028321 A1 * | 1/2009 | Cheng | 379/406.08 |
| 2009/0257579 A1 * | 10/2009 | Takada | 379/406.08 |

* cited by examiner

*Primary Examiner* — Thjuan K Addy
(74) *Attorney, Agent, or Firm* — Yudell Isidore Ng Russell PLLC (57) ABSTRACT

A technique for updating filter coefficients of an adaptive filter includes filtering a signal with an adaptive filter, whose filter coefficients are grouped into filter blocks. In this case a number of the filter blocks is less than or equal to a number of the filter coefficients. During each update period, the filter coefficients for less than all of the filter blocks are updated based on a network echo path impulse response.

20 Claims, 3 Drawing Sheets

FIG. 3

TECHNIQUES FOR UPDATING FILTER COEFFICIENTS OF AN ADAPTIVE FILTER

BACKGROUND

1. Field

This disclosure relates generally to an adaptive filter and, more specifically, to techniques for updating filter coefficients of an adaptive filter.

2. Related Art

Echo cancellation is used in communication systems to remove echo from a voice communication in order to improve voice quality. Echo cancellation involves first recognizing an originally transmitted signal that re-appears, with some delay and linear modification, in a transmitted or received signal. More particularly, a signal affected by the phenomenon of echo produced by the presence of a hybrid circuit and/or acoustical coupling between a mouth-piece and an ear-piece is the signal travelling from the near-end to the far-end. If the point of reference is the near-end part of the connection, then the signal affected corresponds to the transmitted signal. If the point of reference is the far-end part of the connection, then the signal affected corresponds to the received signal. Upon recognition, an echo can be removed by subtracting the echo from a transmitted or received signal. Echo cancellation can be implemented using a digital signal processor (DSP).

Two primary sources of echo in telephony are acoustic echo and hybrid echo. Acoustic echo arises when sound from a speaker of a telephone handset is picked up by a microphone of the telephone handset. For example, acoustic echo may occur in conjunction with hands-free car phone systems, a standard telephone in speakerphone or hands-free mode, conference telephones, installed room systems that use ceiling speakers and table-top microphones, video conferencing systems, etc. Direct acoustic path echo is attributable to sound from a speaker of a handset that enters a microphone of the handset substantially unaltered. When indirect acoustic path echo (reverberation) occurs, the echo can be difficult to effectively cancel (unlike echo associated with a direct acoustic path) as the original sound is altered by ambient space. The altered echo may be attributed to certain frequencies being absorbed by soft furnishings and reflection of different frequencies at varying strength.

Acoustic echo cancellers are usually designed to deal with changes and additions to an original signal caused by imperfections of a speaker, imperfections of a microphone, reverberant space, and physical coupling. In general, acoustic echo cancellation (AEC) algorithms approximate results of a next sample by comparing the difference between current and one or more previous samples. The information has then been used to predict how sound is altered by an acoustic space. In this case, the model of the acoustic space is continually updated. The changing nature of a sampled signal is mainly due to changes in the acoustic environment, not changes in the characteristics of a loudspeaker, a microphone, or physical coupling. That is, changes in a sampled signal are usually attributable to objects moving in an acoustic environment and movement of a microphone within the environment. For example, when a door is closed or opened, a chair is pulled in closer to a table, or drapes are opened or closed a change in reverberation of sound in an acoustic space occurs. To address changes in acoustic space, an echo cancellation algorithm may employ non-linear processing (NLP), which allows an algorithm to make changes to an acoustic space model that are suggested (but not yet confirmed) by signal comparison.

Hybrid (electric) echo is generated in public switched telephone networks (PSTNs) or in packet networks as a result of the reflection of electrical energy by a hybrid circuit. Hybrid echo may also be generated in voice-over-packet network systems, if the systems contain network elements (such as access gateways) that are equipped with access loop interfaces. As is known, most telephone local loops are two-wire circuits, while transmission facilities are usually four-wire circuits. A hybrid circuit or hybrid (typically, a part of an electronic device called a subscriber line interface circuit (SLIC)) converts a signal between the two-wire and four-wire circuits. Unfortunately, when an impedance mismatch occurs, a hybrid produces a hybrid echo signal. An adaptive filter (included in a line echo canceller or a network echo canceller) learns about characteristics of the hybrid during an adaptation process. The output signal from the adaptive filter is inverted and combined with the hybrid echo signal. When the adaptation process is performed correctly, the result of combination of the hybrid echo signal and the inverted output signal of the adaptive filter produces a very small signal (called an error signal). Ideally, the error signal is small such that the error signal is not perceived audibly.

An adaptive filter is a filter that self-adjusts its transfer function according to an optimizing algorithm. Due to the complexity of most optimizing algorithms, adaptive filters are usually implemented as digital filters using DSPs, which modify their filter coefficients based on an input signal. As the power of DSPs has increased, adaptive filters have become more common and are now routinely used in various devices, e.g., echo cancellers, mobile phones and other communication devices, camcorders and digital cameras, and medical monitoring equipment.

A relatively long adaptive filter is required for some line connections and/or access system configurations in order to cancel echo adequately. In general, long adaptive filters have a relatively high computational cost and are slow to converge. However, when a pure delay estimator is employed in conjunction with an adaptive filter, a shorter adaptive filter can usually be employed to model an active portion of a network echo path impulse response. In practice, the adaptation process usually never produces an ideal characteristic of the hybrid and the error signal is often so large that other approaches for reducing the error signal are needed. As mentioned above, a typical method of reducing the energy of the error signal is based on NLP.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with techniques for adjusting filter coefficients of an adaptive filter included in an echo canceller, it will be appreciated that the present invention may find application in various devices (in a wired or wireless communication system) that include a filter whose filter coefficients require adjustment.

As used herein, the term 'coupled' includes a direct electrical connection between elements or components and an indirect electrical connection between elements or components achieved using one or more intervening elements or components. As is also used herein, "Sin signal" refers to a send input (Sin) signal received from a near-end at a Sin port of an echo canceller, "Rout signal" refers to a receive output (Rout) signal provided to the near-end at an Rout port of the echo canceller, "Sout signal" refers to a send output (Sout) signal provided to a far-end at an Sout port of the echo canceller, "Rin signal" refers to a receive input (Rin) signal received from the far-end at an Rin port of an echo canceller and "Sgen signal" refers to a send generated (Sgen) signal generated by a communication device at the near-end.

As noted above, when a pure delay estimator is employed in conjunction with an adaptive filter, a shorter adaptive filter can usually be employed to model an active portion of a network echo path impulse response. Today, a typical network echo canceller that is compliant with the ITU-T G.168 digital echo canceller standard may employ a twenty-four (24) millisecond adaptive filter. Per the ITU-T G.168 digital echo canceller standard, filter coefficients with relatively large values occupy significantly less than twenty-four milliseconds. In general, filter coefficients with small values, while being relatively important to final convergence, contribute little to initial convergence.

According to the present disclosure, techniques are employed that segment an impulse response into multiple filter blocks, each of which may be updated at a different frequency. In general, the techniques are applicable to network echo path characteristics specified in the ITU-T G.168 digital echo canceller standard. It should, however, be appreciated that the techniques disclosed herein may be broadly applied to updating filter coefficients of adaptive filters employed in various applications given a known network echo path model.

According to the present disclosure, an adaptive filter is segmented into 'N' (N≤K, where 'K' is the number of (mite impulse response (FIR) time-domain filter coefficients) filter blocks, each of which may have the same or a different length. For each iteration or input sample, only 'M' filter blocks (where M<N) are selected to be updated and filter coefficients in unselected filter blocks remain unchanged. The choice of which filter block or blocks to update depends on the characteristics of the G.168 specified network echo path model. In general, filter blocks with significant filter coefficients are updated more frequently than filter blocks with less significant filter coefficients. As only a portion of the filter coefficients (of an adaptive filter) are updated each iteration or input sample, less computational power is required. In general, the initial convergence degradation is minimal, as (by design) only relatively small filter coefficients are partially updated (i.e., not updated every input sample). The techniques disclosed herein usually decrease the million clock cycles per second (MCPS) consumption of an adaptive filter implemented within a DSP. Typically, an echo canceller that employs an adaptive filter with a lower MCPS consumption is less expensive and may provide additional channels that may be utilized to implement additional features.

As one example, an echo canceller may implement an adaptive filter with one-hundred ninety-two filter coefficients that is segmented into three filter blocks, with sixty-four coefficients (8 ms) each. In this example, a first block (that includes filter coefficients 1-64, which are the most significant filter coefficients) is updated every input sample. A second block (that includes filter coefficients 65-128, which are less significant filter coefficients) is updated every odd input sample and a third block (including filter coefficients 129-192, which are less significant filter coefficients) is updated every even input sample. In this case, the MCPS saving is about thirty-three percent.

As another example, an echo canceller may implement an adaptive filter with one-hundred ninety-two filter coefficients that is segmented into three blocks as follows: a first block having ninety-six coefficients (12 ms); and second and third blocks each including forty-eight coefficients (6 ms). In this case, the first block (including filter coefficients 1-96, which are the most significant filter coefficients) may be updated every input sample, the second block (including filter coefficients 97-144, which are less significant filter coefficients) may be updated every odd input sample, and the third block (including filter coefficients 145-192, which are less significant filter coefficients) may be updated every even input sample. In this case, the MCPS saving is about twenty-five percent. It should be appreciated that a variety of other combinations may be employed based on overall system tuning requirements. It should also be appreciated that the techniques disclosed herein can be used with virtually any adaptive filtering algorithm (e.g., an affine projection (AP) algorithm, a normalized least mean squares (NLMS) algorithm, a least mean squares (LMS) algorithm, or a recursive least squares (RLS) algorithm).

According to one aspect of the present disclosure, a technique for updating filter coefficients of an adaptive filter includes filtering a signal with an adaptive filter, whose filter coefficients are grouped into filter blocks. In this case a number of the filter blocks is less than or equal to a number of the filter coefficients. During each update period, the filter coefficients for less than all of the filter blocks are updated based on a network echo path impulse response.

According to one aspect of the present disclosure, a communication device includes a control module and an adaptive filter that is in communication with the control module. The adaptive filter is configured to filter a signal and is segmented into filter blocks. In this case, a number of the filter blocks is less than or equal to a number of filter coefficients for the adaptive filter. The filter coefficients are grouped into the filter blocks based on a network echo path impulse response and, during each update period, the filter coefficients for less than all of the filter blocks are updated.

According to another aspect of the present disclosure, a method for updating filter coefficients of an adaptive filter of an echo canceller includes filtering an echo signal with an adaptive filter, whose filter coefficients are grouped into filter blocks based on a network echo path impulse response. In this case, a number of the filter blocks is less than or equal to a number of the filter coefficients. During each update period, the filter coefficients for less than all of the filter blocks are updated based on a metric associated with the filter coefficients.

Figure 1:
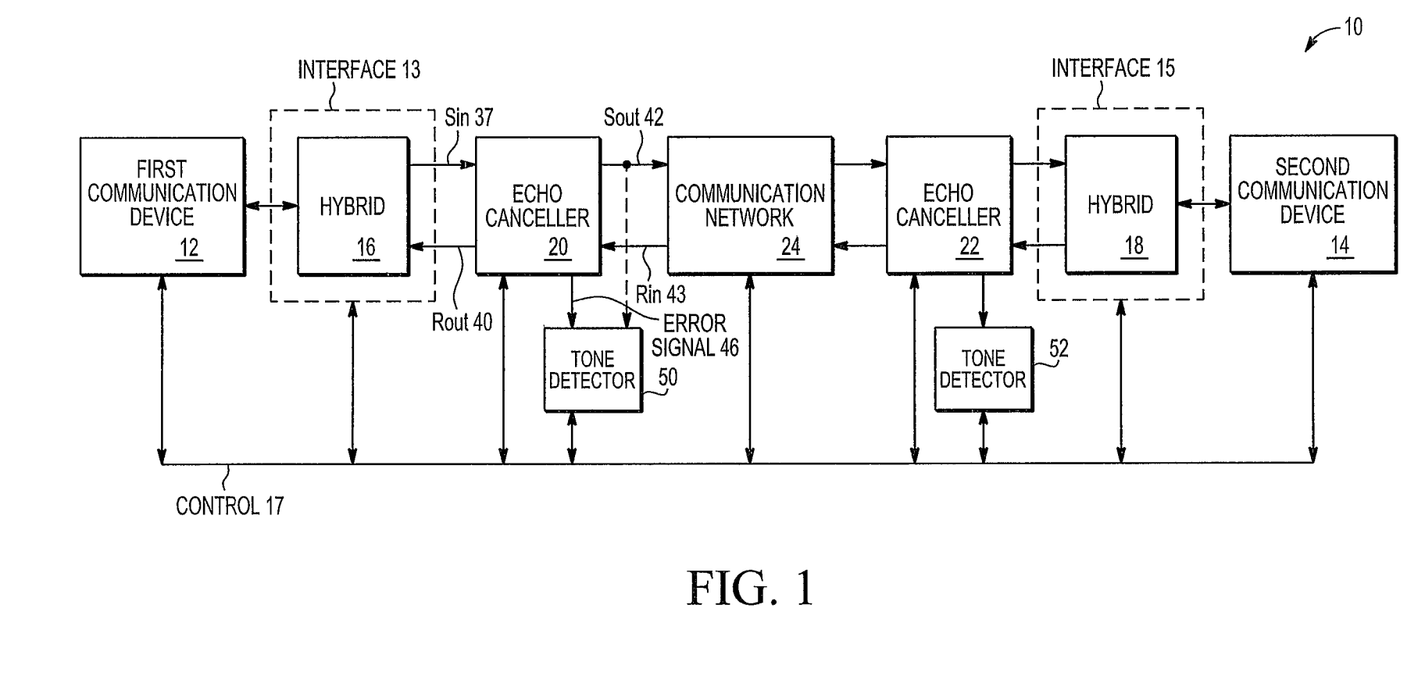
FIG. 1 is a diagram of a relevant portion of an example communication system (which carries voice communications and may carry data) that includes an echo canceller, configured according to an embodiment of the present invention.

With reference to FIG. 1, an example communication system 10 is illustrated that includes echo cancellers that are configured according to the present disclosure. The system 10 includes a transmitter/receiver 12, an interface 13 (which includes hybrid circuit (hybrid) 16), an example echo canceller 20, a tone detector 50, a communication network 24, an example echo canceller 22, a tone detector 52, an interface 15 (which includes hybrid 18), and a transmitter/receiver 14. The transmitter/receiver 12 is coupled to the hybrid 16 (e.g., via a two-wire connection such as a twisted pair of wires), which is coupled to the echo canceller 20. The hybrid 16 provides a send input (Sin) signal 37 to the echo canceller 20 (on an Sin port) and receives a receive output (Rout) signal 40 from the echo canceller 20 (on an Rout port). The Sin signal 37 and the Rout signal 40 may be, for example, provided and received via a wire pair. The echo canceller 20 is coupled to the network 24 and provides an echo canceller send output (Sout) signal 42 to the network 24 (on an Sout port) and receives a receive input (Rin) signal 43 from the network 24 (on an Rin port). An output of the echo canceller 20 is also coupled to an input of the tone detector 50 and provides an error signal 46 to the input of the tone detector 50.

Similarly, the transmitter/receiver 14 is coupled to the hybrid 18, which is coupled to the echo canceller 22, which is coupled to the network 24. The echo canceller 22 also provides an echo cancelled Sout signal to the network 24 and receives a Rin signal from the network 24. The echo canceller 22 also provides an error signal to the tone detector 52. A control bus (control) 17 carries one or more control signals that are provided to each component of the system 10 or a subset of the components of the system 10. In operation, the transmitter/receiver 12 provides communication signals to and receives communication signals from the hybrid 16. The transmitter/receiver 12 can be virtually any device (e.g., a telephone or a modem) used for communicating over the network 24. The transmitter/receiver 14 and the hybrid 18 function in a similar manner as the transmitter/receiver 12 and the hybrid 16, respectively, and for brevity are not discussed in detail herein.

In communications between the transmitter/receiver 12 and the transmitter/receiver 14, electric or hybrid echo may be introduced by the hybrids 16 and 18. As previously noted, the source of the echo is the impedance mismatch between the hybrids 16 and 18 and the network 24. For example, if the impedance within the hybrid 16 perfectly matched the impedance of the network 24, all of the energy from the Rout signal 40 would be transmitted to the transceiver/receiver 12. However, when an impedance mismatch exists, some of the energy from the Rout signal 40 is reflected back through the Sin signal 37. If the round trip delay through the network 24 (e.g., from/to the transmitter/receiver 14 in the case of echo introduced by the hybrid 16) is sufficiently long, the reflected echo received by the transmitter/receiver 14 will be noticeable during the communication. The round trip delay may result in noticeable echoes or even unbearable disturbance during a telephone voice communication.

For example, a sufficiently long delay may correspond to a round trip delay of greater than forty (40) milliseconds. If, on the other hand, the round trip delay is significantly smaller, the echo may not be disruptive since it may be indistinguishable from a side tone. The round trip delay may include a variety and/or combination of different delays, e.g., a transmission delay, a processing delay, and/or a computation delay. Depending on the communication system, the round trip delay may be sufficiently large to disrupt communication. In various embodiments, the echo cancellers 20 and 22 are implemented to reduce echo in the system 10 to a manageable level. For example, the echo introduced by the hybrid 16 from a signal received via the Rout signal 40 (from the transmitter/receiver 14) and reflected back (to the transmitter/receiver 14) via the Sin signal 37 is processed by the echo canceller 20 to reduce the reflected echo prior to sending the Sout signal 42 (through the network 24) to the transmitter/receiver 14.

The tone detector 50 is configured to receive an error signal 46 (from the echo canceller 20) and perform tone detection (on the error signal 46) to determine if a tone (e.g., a dial-tone or a dual-tone multiple frequency (DTMF) signal) is present within the Sin signal 37. The error signal 46 (as is described in further detail in conjunction with FIG. 2) is an intermediate signal within the echo canceller 20. It should be noted that the error signal 46 is not the same as the Sout signal 42, which corresponds to the echo cancelled output of the echo canceller 20. For example, the Sin signal 37 may be a composite signal that includes both voice and tone components (also referred to as voice information and tone information, respectively). The tone components may correspond to a single frequency tone and/or multiple frequency tones and are usually referred to as in-band signaling tones. When the tone components (which are in-band with the voice components) are weak, the processing performed by non-linear processing (NLP) of the echo canceller 20 may distort the Sout signal 42, such that tone components cannot be easily detected in the Sout signal 42. According to an aspect of the present disclosure, the error signal 46 (which is not processed by the NLP of the echo canceller 20) is employed for tone detection. It should be appreciated that the tone detector 50 may correspond to a wide variety of conventional tone detectors.

The network 24 may correspond to a wide variety of wired networks (e.g., a public switched telephone network (PSTN)) or wireless networks that implement a wide variety of protocols, e.g., voice over internet protocol (VoIP), data over packet, or asynchronous transfer mode (ATM). As previously noted, the system 10 includes the control 17. In a typical implementation, the control 17 provides a control pathway for components of the system 10 (i.e., the transmitter/receiver 12 and the transmitter/receiver 14, the hybrids 16 and 18, the echo cancellers 20 and 22, and the network 24). In general, control signals transmitted via the control 17 do not correspond to in-band signals. For example, the control 17 may include an enabling/disabling signal to enable or disable the echo cancellers 20 and 22. As another example, the control 17 may also include a signal to indicate whether a telephone is on-hook or off-hook. The tone detectors 50 and 52 may also send messaging signals (via the control 17) to indicate, for example, that one or more tones have been detected and their corresponding frequency. In the discussion herein, the transmitter/receiver 12 is referred to as the near-end with respect to echo canceller 20 and the transmitter/receiver 14 is referred to as the far-end with respect to the echo canceller 20. It should appreciated that echo canceller 22 operates analogously to the echo canceller 20.

Figure 2:
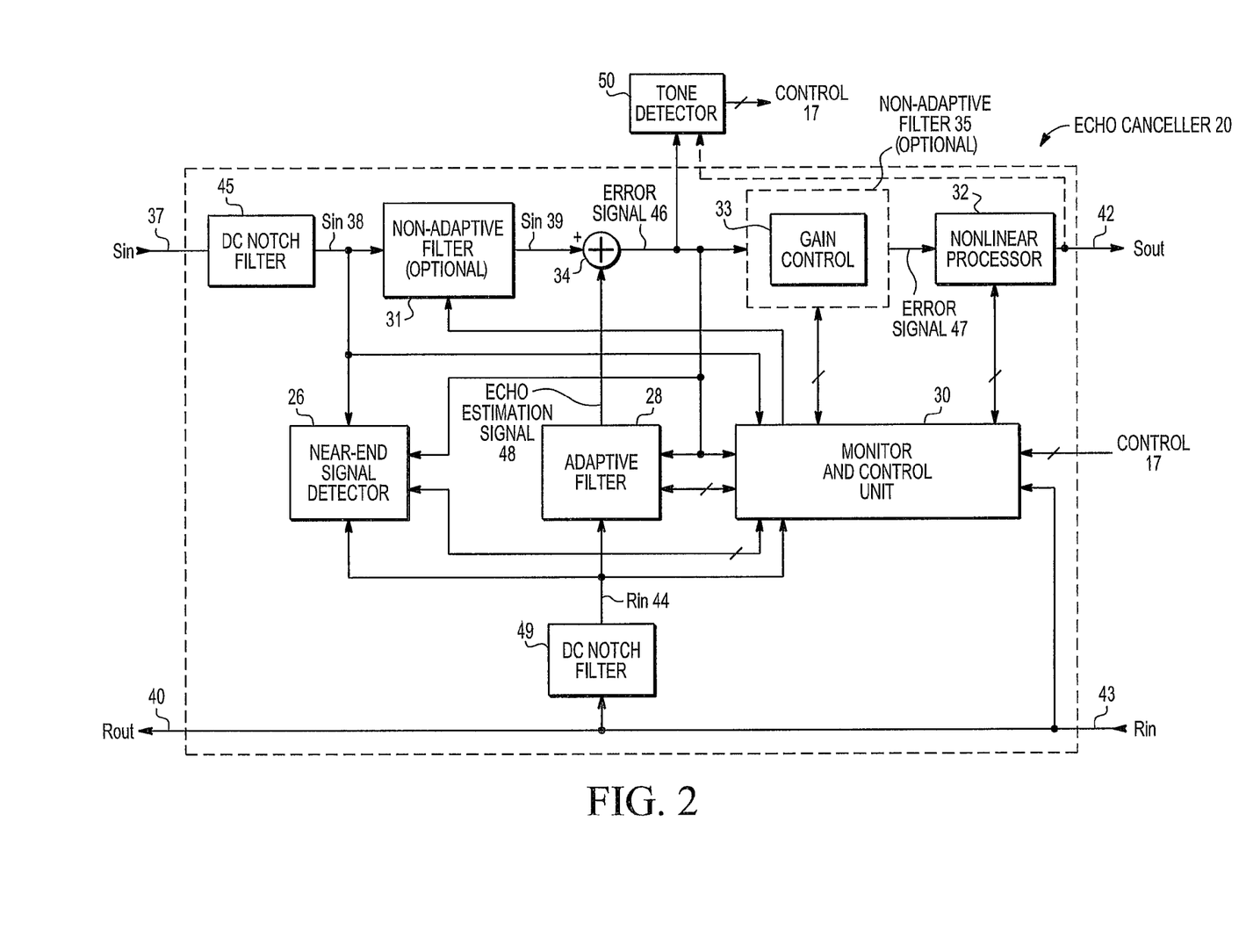
FIG. 2 is a diagram of a relevant portion of an example echo canceller, configured according to an embodiment of the present invention.

With reference to FIG. 2, the echo canceller 20 of FIG. 1 is further illustrated in conjunction with the tone detector 50 of FIG. 1. As is illustrated, the echo canceller 20 includes a direct current (DC) notch filter 45, an optional non-adaptive filter 31, an adder 34, an optional non-adaptive filter 35 (which includes a gain control 33), non-linear processor 32, a near-end signal detector 26, an adaptive filter 28, a monitor and control unit (control unit) 30, and a DC notch filter 49. It should be appreciated that an echo canceller configured according to the present disclosure may include additional (e.g., a pure delay estimator) or fewer components. The DC notch filter 45 receives the Sin signal 37 and outputs Sin signal 38 to an input of the near-end signal detector 26 and an input of the control unit 30. The Sin signal 38 is also provided to an input of the non-adaptive filter 31, which is coupled to and receives control signals from the control unit 30. An output of the non-adaptive filter 31 provides Sin signal 39 to a first input of the adder (combiner) 34. In the event that the non-adaptive filter 31 is omitted, the Sin signal 38 is equivalent to the Sin signal 39.

A second input of the adder 34 receives an echo estimation signal 48 (from the adaptive filter 28) and an output of the adder 34 provides the error signal 46 to an input of the gain control 33, an input of the tone detector 50, an input of the near-end signal detector 26, and an input of the control unit 30. An input/output port of the gain control 33 is coupled to an input/output port of the control unit 30 and an output of the gain control 33 provides an error signal 47 to an input of the non-linear processor 32. In the case where the non-adaptive filter 35 is implemented in the echo canceller 20, the gain control 33 is implemented within the non-adaptive filter 35 (which receives the error signal 46, is bi-directionally coupled to the control unit 30, and provides the error signal 47). The non-linear processor 32 is bi-directionally coupled to a port of the control unit 30 and an output of the non-linear processor 32 provides the Sout signal 42. The control unit 30 is also coupled to the control 17, receives the Rin signal 43, receives an Rin signal 44 from the DC notch filter 49, and is bi-directionally coupled to the adaptive filter 28 and the near-end signal detector 26. The DC notch filter 49 receives the Rin signal 43 (which, in the illustrated embodiment, is the same as Rout signal 40) and provides the Rin signal 44 to the near-end signal detector 26, the adaptive filter 28, and the control unit 30.

In a typical communication, the Sin signal 37 may include voice information, tone information, and reflected echo from the Rin signal 43. It should be appreciated that, in the disclosed embodiment, the error signal 46 is not sent to the network 24. As discussed above, the Sin signal 37 may include reflected echo introduced by the impedance mismatch attributable to the hybrid 16. The echo canceller 20 is configured to reduce (or eliminate) the introduced reflected echo and provides the Sout signal 42. When the impedance in the hybrid 16 is perfectly matched, a signal received at the input of the hybrid 16 (i.e., the Rout signal 40) results in virtually no response from the hybrid 16 (in the Sin signal 37) as there is no reflected echo. However, when the hybrid is in an imbalanced state (where the impedance is mismatched), the Rout signal 40 causes a hybrid impulse response (h). In general, the adaptive filter 28 attempts to imitate the hybrid circuit by producing a replica of the echo signal, which is subtracted from the Sin signal 39 (via the adder 34) to produce the error signal 46. The echo signal (which is equal to the Sin signal 37 when the transmitter/receiver 12 does not produce any signal, i.e., when the near end signal, Sgen, is zero, or absent) corresponds to a linearly distorted Rout signal.

The linear distortions include pure transposition in time, i.e., a shift in time by a parameter called pure delay, and include other linear distortions that are related to hybrid dispersion properties. The pure delay refers to the portion of the impulse response from the beginning to where some significant values start to occur. The dispersion time refers to the portion of the impulse response duration from where the significant responses begins to where the responses virtually disappear. The shape of the impulse response (as per the portion corresponding to the dispersion time segment) can be translated into the frequency characteristic of the hybrid (as seen from the Rout signal 40 and the Sin signal 37 ports).

The DC notch filter 45 removes the DC component from the Sin signal 37. Similarly, the DC notch filter 49 removes the DC component from the Rout signal 40. In an alternate embodiment, a high-pass filter may be used in place of one or both of the filters 45 and 49. In general, DC notch filters (which are usually first-order filters) are computationally cheaper than high-pass filters (which are usually second-order or higher filters) and produce no rippling effect which helps maintain a flat gain through a passband of the filter. In an alternate embodiment, a single shared DC notch filter may be used to perform the functions of the filters 45 and 49.

As noted above, the non-adaptive filters 31 and 35 are optional. For the following discussion, an assumption is made that the Sin signal 38 and the Sin signal 39 are equal and the error signal 47 is a gain adjusted version of the error signal 46, without the effects of the non-adaptive filters 31 and 35. In this case, the Sin signal 39 is the send signal which includes any near-end signal (Sgen) that is transmitted by the transmitter of the transmitter/receiver 12 and any reflected echo introduced from the Rout signal 40 (or the Rin signal 43) by the hybrid 16. As such, the Sin signal 39 can be expressed as "Sgen+echo". It should be appreciated that the near-end signal (Sgen) may include a voice component (e.g., when a near-end talker is present) and/or one or more tone components. If both a voice component and one or more tone components are present, then the Sin signal 39 may be considered a voice/tone composite signal. In operation, the adaptive filter 28 provides an estimation of the reflected echo (corresponds to the echo estimation signal 48) to the adder 34, which outputs the error signal 46.

The error signal 46 can be expressed as 'Sin signal 39−echo estimation signal (estimated echo) 48' or, substituting the above expression for Sin 39, as 'Sgen+echo−estimated echo'. When the estimated echo is accurate (i.e., equal or substantially equal to the actual echo), then the error signal 46 only includes Sgen without any substantial echo. However, if the estimated echo is not accurate, the error signal 46 includes both Sgen and a residual echo component. In this case, the error signal 46 can be expressed as 'Sgen+residual echo' where the residual echo is 'echo−estimated echo'. When Sgen is absent (i.e., when the near-end is silent, meaning no signal is being transmitted from the transmitter of the transmitter/receiver 12), the error signal 46 represents only the residual echo. In this case, the error signal 46 may be used to perform an adaptive process to minimize the residual echo. However, if Sgen is present, the error signal 46 cannot be used to perform the adaptive process because the adaptive filter 28 uses the error to adapt, and with the presence of Sgen, the error signal 46 is no longer just the error. As such, in a typical case, the detection of Sgen is used to determine whether the adaptive process may be performed. The near-end signal detector 26 uses the error signal 46 and control signals from the control unit 30 to detect the presence of Sgen (i.e., to detect the presence of a near-end talker).

In the adaptive filter 28, the echo estimation signal 48, $y(k)$, is calculated by $y(k)=X^T(k) \cdot H(k)$, where $X(k)=[x(k), x(k-1), \ldots, x(k-N+1)]^T$ is the input signal vector extending over the duration of the finite impulse response (FIR) filter span, $x(n)$ corresponds to the Rin signal 44, $H(k)$ is a filter coefficient vector for the kth iteration, where $H(k)=[h_0(k), h_1(k), \ldots, h_{N-1}(k)]^T$. The actual update of the filter coefficients is governed by an implemented algorithm. As noted above, the implemented algorithm may be virtually any application appropriate adaptive filtering algorithm (e.g., an affine projection (AP) algorithm, a normalized least mean squares (NLMS) algorithm, a least mean squares (LMS) algorithm, or a recursive least squares (RLS) algorithm).

Any residual echo in the error signal 46 may be further reduced by the non-linear processor 32. The non-linear processor 32 receives the error signal 47 (which corresponds to a gain adjusted version of the error signal 46) and control signals from the control unit 30 to produce Sout 42, which, ideally, includes no echo and is provided as an output of echo canceller 20 to the network 24. Unfortunately, the non-linear processing performed by non-linear processor 32 introduces distortion into the Sout signal 42. As such, when the Sout signal 42 is a voice/tone composite signal including both voice and tone components, the distortion by non-linear processor 32 may make the tone components difficult to detect. According to an aspect of the present disclosure, the error signal 46 is provided to the tone detector 50 to facilitate improved detection of tone components. In this manner, the tone detector 50 can operate on a less distorted signal (i.e., the error signal 46 instead of the Sout signal 42).

The control unit 30 may implement a filter coefficient monitor which is used to determine whether a true hybrid exists such that adaptive filter 28 does not attempt to adapt to invalid hybrids. The control unit 30 may also include a gain monitor to control the gain control 33 (within the adaptive filter 35) and facilitate maintaining stability of the system 10. The control unit 30 may also include a tone indicator and a tone detector for use in controlling the adaptive filter 35. The tone indicator and tone detector may be used to detect signaling tones within the system 10. For example, the signaling tones may include a 2100 Hz tone with a phase reversal for disabling the echo canceller when data is to be sent following the signaling tone. As mentioned above, disabling the echo canceller 20 prevents the adaptive filter 28 from diverging and causing instability in the system 10. When implemented, the non-adaptive filter 31 can be used to reduce the length of the adaptive filter 28 and the non-adaptive filter 35 compensates for the effects of the non-adaptive filter 31, such that the near-end signal Sgen is not distorted.

In the case of composite signals having both voice and tone components, the non-linear processor tends to introduce distortions, such as temporal clipping and/or attenuation. In at least one embodiment, an echo canceller allows for integrated tone detector capabilities by using an intermediate signal (i.e., the error signal 46) within the echo canceller 20 for tone detection rather than the Sout signal 42 of the echo canceller 20.

Figure 3:
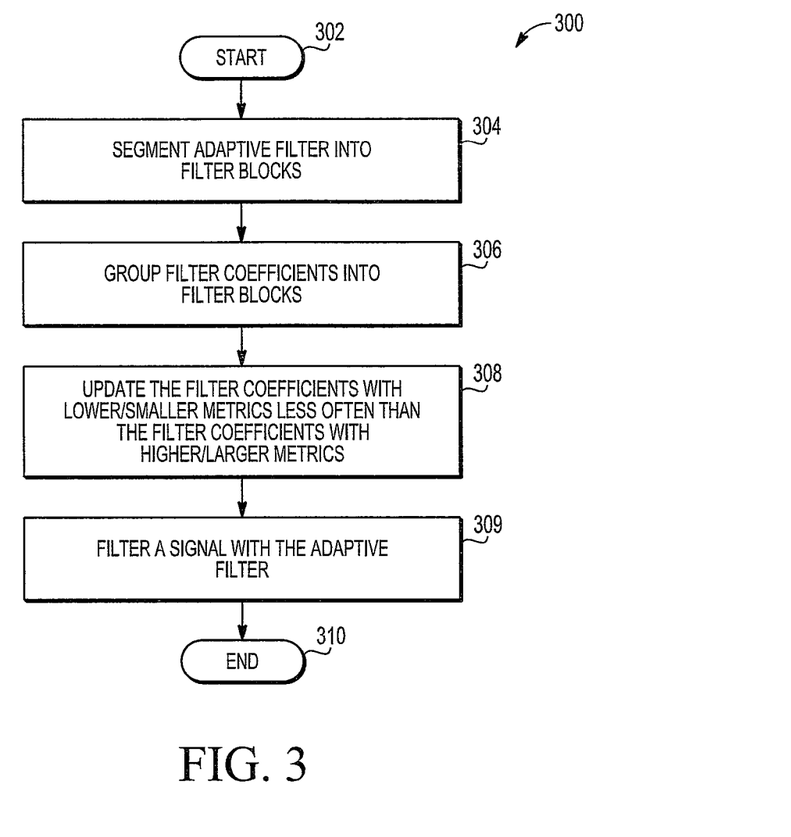
FIG. 3 is a flowchart of an example process for updating filter coefficients of an adaptive filter employed in an echo canceller of a communication system, according to various embodiments of the present invention.

Moving to FIG. 3, an example process 300 for updating filter coefficients of an adaptive filter, according to one or more embodiments of the present disclosure, is illustrated. The adaptive filter may, for example, be included in an echo canceller and be utilized to reduce (or eliminate) an echo signal. The process 300 is initiated in block 302 at which point control transfers to block 304, where the adaptive filter is segmented into filter blocks, each including one or more filter coefficients. In general, the number and size of the blocks may vary, as long as the number and size of the blocks facilitates updating blocks with higher metrics more often than blocks with lower metrics. In a typical case, an adaptive filter is segmented into two or more filter blocks and a size of a given one of the blocks may be chosen based on the values of the filter coefficients of the adaptive filter. As one example, an adaptive filter may be segmented into first, second, and third blocks. Next, in block 306, filter coefficients are grouped into the filter blocks. In various embodiments, the filter coefficients may be grouped into the filter blocks based on a network echo path impulse response. In a usual case, during the adaptation process, when the adaptive filter converges (i.e., when filter coefficients of the adaptive filter better resemble filter coefficients of a linear model of an echo path impulse response), the filter coefficients can be analyzed in real-time.

During real-time analysis, filter coefficient can be grouped into blocks based on various metrics (e.g., absolute value, magnitude, or energy). As one example, some of the filter coefficients may have relatively large values and other of the filter coefficients may have relatively small values. According to the present disclosure, the process of determining a metric of the filter coefficient is implemented in real-time. For example, the grouping of the filter coefficients into blocks may be based on magnitudes of the filter coefficients through a comparison of peak values.

For example, assuming an adaptive filter has only eight filter coefficients and after an initial adaptation the filter coefficients (which values typically start with an initial condition of zero) achieve the following values: 0; −0.01; 0.2; 0.5; 0.1; −0.1; 0.01; and −0.01. In this case, a maximum filter coefficient value is 0.5. Assuming the filter coefficients are grouped into three blocks, a first block may include the filter coefficient values [0, −0.01], a second block may include the filter coefficient values [0.01, −0.01], and a third block may include the filter coefficient values [0.2; 0.5; 0.1; −0.1]. In this example, the coefficient values of the first and second blocks are significantly smaller than the maximum filter coefficient value of 0.5. In this case, according to the present disclosure, the first and second blocks (corresponding to filter coefficient indices 1, 2, 7, and 8) are updated less often than the third block (corresponding to the filter coefficient indices 3, 4, 5, and 6). It should be appreciated that the partitioning of filter coefficients into filter blocks may be based on various criteria. For example, filter coefficients that have values of ten percent or less of a maximum filter coefficient value can be considered as sufficiently small and updated less often than other filter coefficients. As another example, only those filter coefficients that are at least five percent or more of a maximum filter coefficient magnitude may be updated each input sample of an echo signal.

Then, in block 308, the filter coefficients for less than all of the filter blocks are updated each update period. In general, filter coefficients with lower/smaller metrics are updated less often than filter coefficients with higher/larger metrics. For example, filter coefficients for filter blocks that exhibit a higher energy, a higher absolute value, or a higher magnitude are updated more frequently than filter coefficients for filter blocks that exhibit a lower energy, a lower absolute value, or a lower magnitude, respectively.

As one example, when the adaptive filter is segmented into the first, second, and third blocks: the filter coefficients for the first block may be updated for each input sample (assumes that the first block has more significant filter coefficients that the second and third blocks); the filter coefficients for the second block may be updated for odd input samples, and the filter coefficients for the third block may be updated for even input samples. As another example, the first block may include ninety-six of the filter coefficients, the second block may include forty-eight of the filter coefficients, and the third block may include forty-eight of the filter coefficients. As yet another example, the first, second, and third blocks may each include sixty-four filter coefficients. Next, in block 309, the echo signal is filtered with the converged segmented adaptive filter. Following block 309, control transfers to block 310, where the process 300 terminates and control returns to a calling process.

In general, most significant filter coefficients are located in a beginning portion of an adaptive filter when estimation of a pure delay value is adequate. Accordingly, an adaptive filter is segmented into 'N' filter blocks (N≤K, where 'K' is the number of FIR filter coefficients). For each iteration, only 'M' (M<N) filter blocks are selected to be updated and filter coefficients in unselected blocks remain unchanged. As noted above, the choice of filter blocks is usually dependent on the characteristics of the specified network echo path model. The general idea is that the filter blocks with more significant filter coefficient values are updated more frequently than filter coefficients belonging to filter blocks with less significant filter coefficient values. As only a portion of the filter coefficients are updated each sample, less computational power is required.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to wired and wireless communication systems that facilitate voice communication, in addition to data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for updating filter coefficients of an adaptive filter, comprising:
    filtering a signal with an adaptive filter whose filter coefficients are grouped into filter blocks, wherein a number of the filter blocks is less than or equal to a number of the filter coefficients; and
    updating, for each input sample of the signal, the filter coefficients for at least one of the filter blocks but less than all of the filter blocks based on a network echo path impulse response.

2. The method of claim 1, further comprising:
    segmenting the adaptive filter into filter blocks based on values of the filter coefficients.

3. The method of claim 1, wherein the updating further comprises:
    updating the filter coefficients for the filter blocks that exhibit a higher energy more frequently than the filter coefficients for the filter blocks that exhibit a lower energy.

4. The method of claim 1, wherein the updating further comprises:
    updating the filter coefficients for the filter blocks that exhibit a larger absolute value more frequently than the filter coefficients for the filter blocks that exhibit a lower absolute value.

5. The method of claim 1, wherein the updating further comprises:
    updating the filter coefficients for the filter blocks that exhibit a higher magnitude more frequently than the filter coefficients for the filter blocks that exhibit a lower magnitude.

6. The method of claim 1, wherein a length of the filter blocks is the same.

7. The method of claim 1, wherein a length of at least two of the filter blocks is different.

8. The method of claim 1, wherein the filter blocks includes first, second, and third blocks, and wherein the filter coefficients in the first block have a higher energy, absolute value, or magnitude than the filter coefficients in the second and third blocks and the updating further comprises:
    updating, for each input sample of the signal, the filter coefficients for the first block;
    updating, for odd input samples of the signal, the filter coefficients for the second block; and
    updating, for even input samples of the signal, the filter coefficients for the third block.

9. The method of claim 1, wherein the adaptive filter implements an affine projection (AP) algorithm, a normalized least mean squares (NLMS) algorithm, a least mean squares (LMS) algorithm, or a recursive least squares (RLS) algorithm during the updating of the filter coefficients.

10. The method of claim 1, further comprising:
    grouping the filter coefficients into the filter blocks based on the network echo path impulse response.

11. The method of claim 1, wherein the signal is an echo signal and the adaptive filter is configured to reduce the echo signal.

12. A communication device, comprising:
    a control module; and
    an adaptive filter in communication with the control module, wherein the adaptive filter is configured to filter a signal and is segmented into filter blocks, and wherein a number of the filter blocks is less than or equal to a number of filter coefficients for the adaptive filter, the filter coefficients are grouped into the filter blocks based on a network echo path impulse response, and, for each input sample of the signal, the filter coefficients for at least one of the filter blocks but less than all of the filter blocks are updated.

13. The communication device of claim 12, wherein the filter coefficients for the filter block that exhibits a highest energy is updated more frequently than the filter coefficients for the filter blocks that exhibit a lower energy.

14. The communication device of claim 12, wherein the filter coefficients for the filter block that exhibits a larger magnitude is updated more frequently than the filter coefficients for the filter blocks that exhibit a smaller magnitude.

15. The communication device of claim 12, wherein the filter coefficients for the filter block that exhibits a highest absolute value is updated more frequently than the filter coefficients for the filter blocks that exhibit a lower absolute value.

16. The communication device of claim 12, wherein a length of the filter blocks is the same.

17. The communication device of claim 12, wherein a length of at least two of the filter blocks is different.

18. The communication device of claim 12, wherein the signal is an echo signal and the communication device is an echo canceller.

19. A method for updating filter coefficients of an adaptive filter of an echo canceller, comprising:
- filtering an echo signal with an adaptive filter whose filter coefficients are grouped into filter blocks based on a network echo path impulse response, wherein a number of the filter blocks is less than or equal to a number of the filter coefficients; and
- updating, for each input sample of the signal, the filter coefficients for at least one of the filter blocks but less than all of the filter blocks based on a metric associated with the filter coefficients.

20. The method of claim 19, wherein a length of at least two of the filter blocks is different.

\* \* \* \* \*